(12) United States Patent
Sprouse et al.

(10) Patent No.: US 6,755,359 B2
(45) Date of Patent: Jun. 29, 2004

(54) FLUID MIXING INJECTOR AND METHOD

(75) Inventors: Kenneth M. Sprouse, Northridge, CA (US); David R. Matthews, Simi Vally, CA (US); Robert J. Jensen, Thousand Oaks, CA (US)

(73) Assignee: The Boeing Company, Seattle, WA (US)

( * ) Notice: Subject to any disclaimer, the term of this patent is extended or adjusted under 35 U.S.C. 154(b) by 33 days.

(21) Appl. No.: 10/242,780

(22) Filed: Sep. 12, 2002

(65) Prior Publication Data

US 2004/0050982 A1 Mar. 18, 2004

(51) Int. Cl.[7] .............................. B05B 7/10; B05B 7/06; B05B 1/00
(52) U.S. Cl. ..................... 239/405; 239/406; 239/432; 239/596
(58) Field of Search ................................ 239/596, 403, 239/404, 405, 406, 432, 433

(56) References Cited

U.S. PATENT DOCUMENTS

| | | | |
|---|---|---|---|
| 2,636,778 A | | 4/1953 | Michelsen |
| 2,785,926 A | | 3/1957 | Lataste |
| 2,857,204 A | | 10/1958 | Gross |
| 2,930,532 A | | 3/1960 | Johnson |
| 3,056,559 A | | 10/1962 | Orr |
| 3,093,315 A | | 6/1963 | Tachiki et al. |
| 3,121,639 A | | 2/1964 | Bauer et al. |
| 3,254,846 A | * | 6/1966 | Schreter et al. ............ 239/400 |
| 3,430,863 A | | 3/1969 | Canavan et al. |
| 3,576,384 A | * | 4/1971 | Peczeli et al. .............. 431/353 |
| 3,610,537 A | | 10/1971 | Nakagawa et al. |
| 3,758,259 A | * | 9/1973 | Voorheis ........................ 431/9 |
| 3,779,212 A | | 12/1973 | Wagner |
| 3,837,788 A | | 9/1974 | Craig et al. |
| 3,847,564 A | * | 11/1974 | Marion et al. ................. 48/95 |
| 3,850,569 A | * | 11/1974 | Alquist .......................... 431/4 |
| 3,923,011 A | | 12/1975 | Pfefferle |
| 3,928,961 A | | 12/1975 | Pfefferle |
| 4,021,186 A | | 5/1977 | Tenner |

(List continued on next page.)

FOREIGN PATENT DOCUMENTS

WO     WO 00/43712     7/2000

OTHER PUBLICATIONS

O. Bolland and S. Saether, New Concepts For Natural Gas Fired Power Plants Which Simplify The Recovery Of Carbon Dioxide; Energy Convers. Mgmt, 1992, pp. 467–475, vol. 33, No. 5–8, Pergamon Press Ltd, Great Britain.

Olav Bolland and Philippe Mathieu, Comparison Of Two $CO_2$ Removal Options In Combined Cycle Power Plants, Energy Convers. Mgmt, 1998, pp. 1653–1663, vol. 39, No. 16–18, Elsevier Science Ltd, Great Britain.

*Primary Examiner*—William C. Doerrler
(74) *Attorney, Agent, or Firm*—Alston & Bird LLP (57) ABSTRACT

An injection system, injector, and associated method are provided for injecting and combusting combustion fluids in a combustion chamber. The system includes a faceplate that faces the combustion chamber and a plurality of injectors that extend through the faceplate. Each of the injectors has an injector body with an outlet side. A fuel bore extends from a fuel bore inlet to a fuel bore outlet located at the outlet side of the injector. Each injector also includes a swirler chamber with at least one inlet for receiving steam and an oxidizing fluid and an oxidizing fluid outlet located on the injector outlet side. A converging channel extends from the oxidizing fluid outlet to the swirler chamber, and the converging channel converges relative to the fuel bore so that steam and oxidizing fluid exiting the injector through the oxidizing fluid outlet impinge on a stream of fuel in the combustion chamber flowing from the fuel bore.

39 Claims, 6 Drawing Sheets

U.S. PATENT DOCUMENTS

| | | |
|---|---|---|
| 4,021,188 A | 5/1977 | Yamagishi et al. |
| 4,054,407 A | 10/1977 | Carrubba et al. |
| 4,102,125 A | 7/1978 | Schelp |
| 4,173,118 A | 11/1979 | Kawaguchi |
| 4,216,908 A | 8/1980 | Sakurai et al. |
| 4,271,664 A | 6/1981 | Earnest |
| 4,288,408 A | 9/1981 | Guth et al. |
| 4,297,093 A | 10/1981 | Morimoto et al. |
| 4,316,580 A | 2/1982 | Bodai |
| 4,356,698 A | 11/1982 | Chamberlain |
| 4,395,874 A * | 8/1983 | Striebel et al. ............ 60/39.58 |
| 4,407,450 A | 10/1983 | Chegolya et al. |
| 4,502,633 A * | 3/1985 | Saxon .................... 239/132.3 |
| 4,504,211 A | 3/1985 | Beardmore |
| 4,575,332 A | 3/1986 | Oppenberg et al. |
| 4,600,151 A * | 7/1986 | Bradley ...................... 239/400 |
| 4,644,878 A * | 2/1987 | Nodd et al. ................. 110/264 |
| 4,773,596 A | 9/1988 | Wright et al. |
| 4,783,008 A | 11/1988 | Ikeuchi et al. |
| 4,784,600 A | 11/1988 | Moreno |
| 4,801,092 A | 1/1989 | Webber et al. |
| 4,893,468 A | 1/1990 | Hines |
| 4,912,931 A | 4/1990 | Joshi et al. |
| 4,936,088 A | 6/1990 | Bell |
| 4,955,191 A | 9/1990 | Okamoto et al. |
| 4,958,488 A | 9/1990 | Wilkes et al. |
| 4,989,549 A | 2/1991 | Korenberg |
| 5,025,631 A | 6/1991 | Garbo |
| 5,029,557 A * | 7/1991 | Korenberg ................. 122/149 |
| 5,103,630 A | 4/1992 | Correa |
| 5,158,445 A | 10/1992 | Khinkis |
| 5,161,379 A * | 11/1992 | Jones et al. .................... 60/740 |
| 5,224,333 A | 7/1993 | Bretz et al. |
| 5,228,283 A * | 7/1993 | Sciocchetti ................. 60/775 |
| 5,247,791 A | 9/1993 | Pak et al. |
| 5,259,184 A | 11/1993 | Borkowicz et al. |
| 5,285,628 A | 2/1994 | Korenberg |
| 5,288,021 A | 2/1994 | Sood et al. |
| RE35,061 E | 10/1995 | Correa |
| 5,462,430 A | 10/1995 | Khinkis |
| 5,467,926 A | 11/1995 | Idleman et al. |
| 5,557,921 A * | 9/1996 | Frutschi et al. ............ 60/39.53 |
| 5,675,971 A | 10/1997 | Angel et al. |
| 5,680,765 A | 10/1997 | Choi et al. |
| 5,680,766 A | 10/1997 | Joshi et al. |
| 5,709,077 A | 1/1998 | Beichel |
| 5,713,205 A | 2/1998 | Sciocchetti et al. |
| 5,715,673 A | 2/1998 | Beichel |
| 5,743,081 A | 4/1998 | Reynolds |
| 5,778,676 A | 7/1998 | Joshi et al. |
| 5,833,141 A | 11/1998 | Bechtel, II et al. |
| 5,894,720 A | 4/1999 | Willis et al. |
| 5,906,094 A | 5/1999 | Yang et al. |
| 5,906,806 A | 5/1999 | Clark |
| 5,934,064 A | 8/1999 | Newby et al. |
| 5,950,417 A | 9/1999 | Robertson, Jr. et al. |
| 5,956,937 A | 9/1999 | Beichel |
| 5,966,937 A | 10/1999 | Graves |
| 5,970,702 A | 10/1999 | Beichel |
| 6,065,281 A | 5/2000 | Shekleton et al. |
| 6,076,745 A | 6/2000 | Primdahl |
| 6,082,112 A | 7/2000 | Shekleton |
| 6,148,602 A * | 11/2000 | Demetri ...................... 60/775 |
| 6,162,266 A | 12/2000 | Wallace et al. |
| 6,170,264 B1 * | 1/2001 | Viteri et al. .................. 60/671 |
| 6,206,684 B1 | 3/2001 | Mueggenburg |
| 6,474,569 B1 * | 11/2002 | Brundish et al. ........... 239/406 |

\* cited by examiner

FLUID MIXING INJECTOR AND METHOD

BACKGROUND OF THE INVENTION

1) Field of the Invention

This invention relates generally to apparatuses and methods for injecting fluids and more specifically to an injector and associated method for injecting combustion fluids into a combustion chamber.

2) Description of Related Art

The combustion of carbon-based compounds, or carbonaceous fuels, is widely used for generating kinetic and electrical power. In one typical electric generation system, a carbonaceous fuel such as natural gas is mixed with an oxidizer and combusted in a combustion device called a gas generator. The resulting combusted gas is discharged to, and used to rotate, a turbine, which is mechanically coupled to an electric generator. The combusted gas is often discharged to one or more additional combustion devices, called reheaters, where the combusted gas is mixed with additional fuel and/or oxidizer for subsequent combustion.

Gas generators and reheaters are generally similar combustion devices, but gas generators have traditionally been used as initial combustion devices and reheaters have traditionally been used as secondary combustion devices that recombust a gas after the gas has gone through an initial combustion device. Gas generators typically combust at least some liquid combustion components, e.g. liquid water, while reheaters typically combust only gases including, for example, steam. Therefore, the volumetric expansion of the combustion gases in a typical gas generator is higher than that of a reheater. Further, the pressure drop across the injector system of a gas generator is typically higher than that of a reheater.

The combustion in both gas generators and reheaters results in high temperatures and pressures. In some systems, pure oxygen is used as the oxidizer to eliminate the production of nitric oxides (NOx) and sulfur oxides (SOx) that typically result from combustion with air. The temperature in such an oxygen-fed system can be especially high, sometimes exceeding 5000° F. Such extreme conditions increase the stress on components in and around the combustion chambers, increasing the likelihood of failure of such components and decreasing their useful lives accordingly.

Injectors are used to inject the combustion components of fuel, oxidizer, and/or recycled gases into the combustion chambers of the gas generator and reheaters. Because of their position proximate to the combustion chambers, the injectors are subjected to the extreme temperatures of the combustion chamber. Additionally, the injectors may be heated by the passage of preheated combustion components therethrough. Failure of the injectors due to the resulting thermal stress caused by overheating increases operating costs, increases the likelihood of machine downtime, and presents an increased danger of worker injury and equipment damage.

One proposed injector incorporates a mixer for combining a coolant with the fuel before the fuel is combusted. For example, U.S. Pat. No. 6,206,684 to Mueggenburg describes an injector assembly 10 that includes two mixers 30, 80. The first mixer 30 mixes an oxidizer with a fuel, and the second mixer 80 mixes coolant water with the prior mixed fuel and oxidizer. The mixture then flows through a face 121 to a combustion chamber 12 for combustion. The coolant water reduces the temperature of combustion of the fuel, easing the stress on the system components. One danger presented by such a design is the possibility of "flashback," or the combustion flame advancing from the combustion chamber into the injector. Flashback is unlikely in an injector outlet that has a diameter smaller than the mixture's "quenching distance". Thus, flashback can be prevented by limiting the size of the injectors. Undesirably, however, a greater number of small injectors is required to maintain a specified flow rate of the combustion mixture. The increased number of injectors complicates the assembly. Small injectors are also typically less space-efficient because the small injectors require more space on the face than would a lesser number of large injectors that achieve the same flow rate. Space on the face is limited, so devoting more space to the injectors leaves less space for other uses, such as devices for injecting coolant into the combustion chamber.

Because sufficient quantities of coolant sometimes cannot be injected from the face, coolant must be injected further downstream. The injection of liquid coolant presents a danger to turbine blades located downstream from the combustion device. If the coolant is not fully vaporized before reaching the turbine, droplets of liquid coolant can damage the turbine blades. Injection of large volumes of a liquid coolant near the turbine blades can increase the likelihood of droplets progressing to the turbine blades, and decrease the useful life of the blades. Turbine blades are sometimes protected by splash plates, which provide a physical barrier to prevent the progression of liquid coolant. However, splash plates add complication to the system, requiring additional service and increasing the cost of the system. Splash plates can also interfere with the flow of gas through the combustion chamber and turbine, and are sometimes not fully effective in protecting the turbine blades.

Additionally, small injectors are subject to further complications due to their size. For example, small passages and outlets in the injectors can become blocked by particulates present in the fuel, oxidizer, or coolant. Thus, the reactants must be carefully filtered before passing through the injector. The need for filters also increases the complexity and cost of the system, as well as the likelihood of failure.

Thus, there exists a need for an apparatus and method for injecting fluid components of combustion into a combustion chamber. The injector and method should prevent liquid water from progressing to downstream turbine blades and should minimize the likelihood of flashback. Preferably, the injector should not be overly complex and should not require stringent filtering of the combustion components. The injector and method should be adaptable for use with gas generators and reheaters of various sizes. Further, the injector and method should facilitate efficient combustion, even at varying flow rates and limit the temperature of the injector to decrease thermal stress, likelihood of failure, and operating costs.

BRIEF SUMMARY OF THE INVENTION

The present invention provides an injection system, an injector, and an associated method for injecting combustion fluids into a combustion chamber. Each injector injects an oxidizing fluid formed from a mixture of steam and oxygen to impinge on, and mix with, a stream of fuel in a combustion chamber. Mixing the oxidizing fluid and fuel in the combustion chamber decreases the likelihood of flashback, even with relatively large streams of fuel. Any number of injectors can be included on a faceplate of an injection system for a gas generator or reheater, and the thorough mixing provided by the injector also increases the efficiency of the combustion, even at low flow rates. Further, the flexibility in the size of the injectors also increases the potentially available space on the faceplate for coolant injectors. Locating the coolant injectors at the faceplate reduces the likelihood of coolant droplets progressing through the combustion chamber to the turbine.

According to one embodiment of the present invention, the injection system includes a first faceplate and a plurality of injectors extending through the first faceplate. The faceplate has an inlet side and an outlet side that faces the combustion chamber. Each of the injectors has a fuel bore that extends from a fuel bore inlet to a fuel bore outlet located at an outlet side of the injector. The diameter of the fuel bore can converge in a direction from the fuel bore inlet to the fuel bore outlet. A swirler chamber defined by the injector has at least one inlet for receiving steam and oxygen, which are preferably mixed before entering the inlet. A converging channel extends from the swirler chamber to an oxidizing fluid outlet located on the injector outlet side. The converging channel of each injector is configured relative to the fuel bore such that oxidizing fluid that exits through the oxidizing fluid outlet impinges on a stream of fuel in the combustion chamber following exit of the stream of fuel from the fuel bore.

According to one aspect of the invention, a center of each of the injectors is located at least 1 inch from the centers of the other injectors. A source of carbonaceous fuel can be fluidly connected to each of the fuel bore inlets of the injectors, and each inlet of the swirler chambers can be fluidly connected to a source of oxidizing fluid comprising steam and oxygen substantially free of nitrogen and sulfur. In one embodiment, the oxidizing fluid comprise at least 50% steam as measured on a weight basis.

According to another aspect, each of the swirler chambers defines a slot that extends circumferentially around the fuel bore of the respective injector. The converging channel of the injector can converge at an angle of between about 10° and 45° relative to the fuel bore such that the oxidizing fluid exiting each injector impinges on the stream of fuel in the combustion chamber. The converging channel can also converge toward the respective fuel bore such that the oxidizing fluid exiting the injector impinges on the stream of fuel in the combustion chamber in a region located within about 2 inches of the first faceplate. The inlets of the swirler chambers can extend in a radial direction from the swirler chambers to the outside of the injector bodies such that fluid flowing into each of the swirler chambers through the swirler chamber inlets swirls in a circumferential direction around the respective fuel bore. Further, a vane can be disposed in each of the swirler chambers and configured to induce a swirling motion to fluid flowing through the respective swirler chamber.

According to another aspect of the present invention, a plurality of water injectors are configured to inject water into the combustion chamber from the first faceplate. The water injectors can be configured such that the combustion fuel travels a distance of at least about 10 inches from the first faceplate before mixing with the water, and the water injectors can be fluidly connected to at least one coolant chamber defined by the first faceplate. In one aspect, a second faceplate faces the inlet side of the first faceplate, and the two faceplates define at least one coolant chamber therebetween, the coolant chamber being configured to receive and circulate a coolant fluid for cooling the faceplate. Further, an interpropellant plate can face the second faceplate, and the interpropellant plate and the second faceplate can define at least one oxidizing fluid chamber fluidly connected to the at least one inlet of the swirler chambers of the injectors.

In another aspect, the combustion chamber defines a passage from the outlet side of the first faceplate to a turbine, and the passage is uninterrupted by splash plates. The injection system can also include at least one water injector configured to inject water into the combustion chamber at a location downstream of the faceplate.

The present invention also provides an injector for injecting fluids into a combustion chamber. The injector has an injector body with an inlet side and outlet side. A fuel bore extends from a fuel bore inlet to a fuel bore outlet located on the outlet side. The fuel bore can converge in a direction from the fuel bore inlet to the fuel bore outlet. A swirler chamber is defined by the injector body and has at least one inlet for receiving steam and oxygen. A converging channel extends from the swirler chamber to an oxidizing fluid outlet located at the outlet side of the injector body. The converging channel is configured relative to the fuel bore such that oxidizing fluid exiting the injector through the oxidizing fluid outlet impinges on a stream of fuel in the combustion chamber flowing from the fuel bore through the fuel outlet.

The swirler chamber can extend circumferentially about the fuel bore such that the steam and oxygen can flow circumferentially in the swirler chamber. The converging channel can converge at an angle of between about 10° and 45° relative to the fuel bore such that the oxidizing fluid exiting the injector impinges on the stream of fuel in the combustion chamber. The converging channel can also be configured such that the oxidizing fluid impinges on the stream of fuel in the combustion chamber in a region located within about 2 inches of the fuel bore outlet.

In one embodiment, each of the inlets of the swirler chamber extends in a radial direction from the swirler chamber to the outside of the injector body such that fluid flowing into the swirler chamber through the swirler chamber inlets swirls in a circumferential direction around the fuel bore. One or more vanes can also be disposed in the swirler chamber, extending in a circumferential direction around the fuel bore and configured to induce a swirling motion to fluid flowing through the swirler chamber.

The present invention also provides a method of injecting and combusting combustion fluids in a combustion chamber. The method includes injecting a combustion fuel such as a carbonaceous gas into the combustion chamber. An oxidizing fluid comprising oxygen and steam is injected into the combustion chamber such that the oxidizing fluid impinges on the combustion fuel in the combustion chamber. The oxidizing fluid can be substantially free of nitrogen and sulfur, and the oxidizing fluid can include at least 50% steam as measured on a weight basis. The method also includes combusting the combustion fuel with the oxidizing fluid. The steam can be used to limit the flame temperature to below about 4000° F.

In one aspect of the invention, the combustion fuel and oxidizing fluid is injected through a plurality of injectors, and a center of each of the injectors is located at least 1 inch from the centers of the other injectors.

The steam and oxygen can be mixed by swirling the oxygen and steam in a circumferential direction within the injector. The combustion fuel can be injected through a fuel bore outlet and the oxidizing fluid can be injected at an angle of between about 10° and 45° relative to the fuel bore such that the oxidizing fluid impinges on the combustion fuel in the combustion chamber. The oxidizing fluid can also be injected to impinge on the combustion fuel in the combustion chamber in a region located within about 2 inches of the fuel bore outlet.

In another aspect of the invention, the combustion fuel and a coolant are injected into the combustion chamber through the faceplate. The coolant can be injected in a direction such that the combustion fuel travels a distance of at least about 10 inches into the combustion chamber before mixing with the coolant. Further, the coolant can be circulating through a faceplate cooling chamber defined by the faceplate.

Thus, the present invention provides a system, injector, and method for injecting fluid components of combustion into a combustion chamber. The injectors control the combustion temperature by mixing steam with oxygen and impinging the resulting oxidizing fluid on the fuel in the combustion chamber, thus limiting thermal stress of system components. Mixing the oxidizing fluid and fuel in the combustion chamber minimizes the risk of flashback and allows the use of larger streams of fuel. The system can include any number of injectors, and provides efficient combustion even at low flow rates in a gas generator or a reheater. Complexity and risk of turbine damage are decreased by locating coolant injectors at the faceplate.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
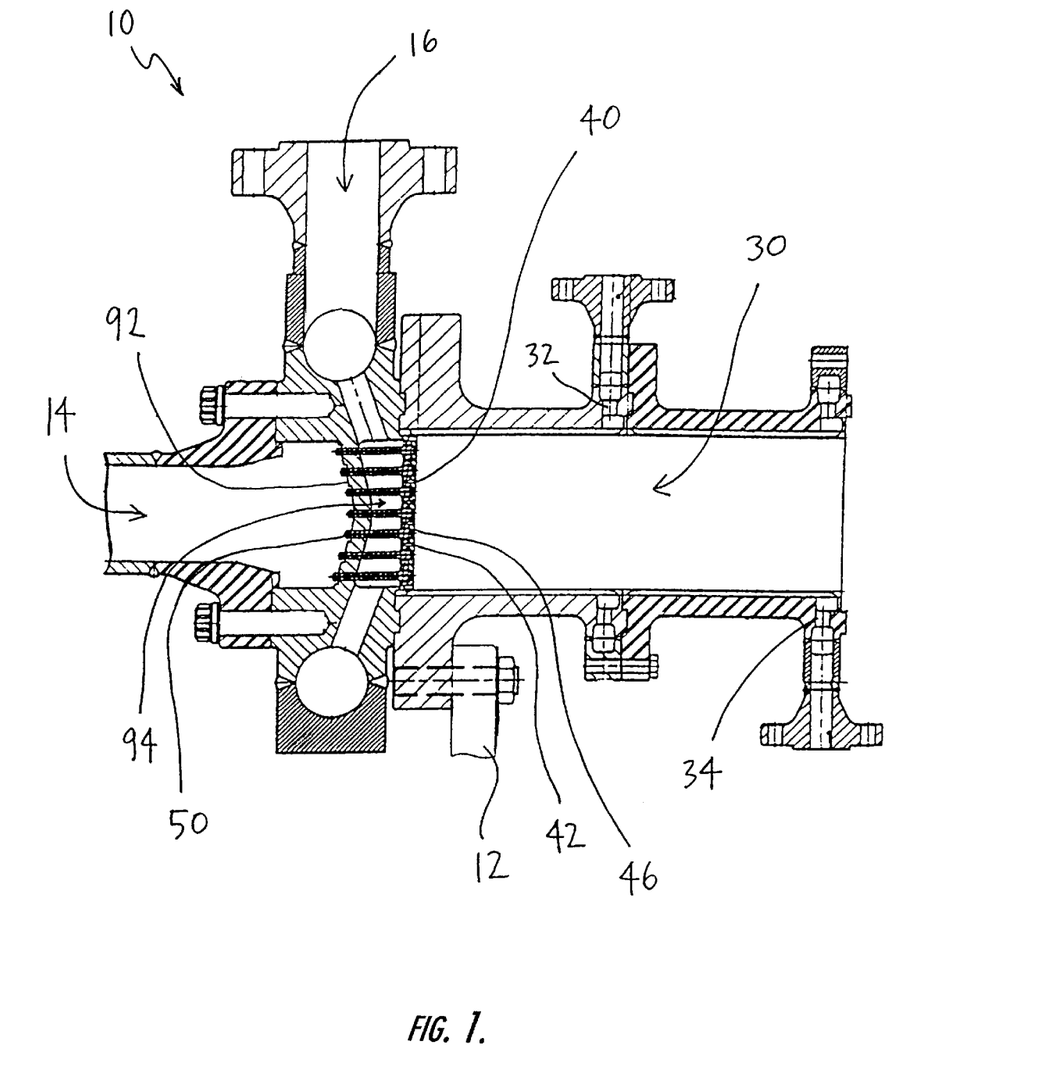
FIG. 1 is a cross section view of a combustion device according to the present invention.

There is shown in FIG. 1 a combustion device 10 according to the present invention, which is used to inject fluids into a combustion chamber 30 and combust the fluids therein. The combustion device 10 can comprise, for, example, a gas generator or a reheater that is used to combust fluids in a power generation plant. The combustion device 10 includes a fuel inlet 14, an oxidizing fluid inlet 16, and an injection system 40. The injection system 40 is used to inject the fuel and oxidizing fluid from the inlets 14, 16 through a faceplate 42 and into the combustion chamber 30. The combustion device 10 also includes forward and aft chamber coolant injectors 32, 34, though it is anticipated that neither of the chamber coolant injectors 32, 34 is necessary for operation of the combustion device 10, as discussed below. The combustion device 10 can be connected by a mount 12 to other parts of the power generation plant, including one or more turbines and electric generators (not shown).

Figure 2:
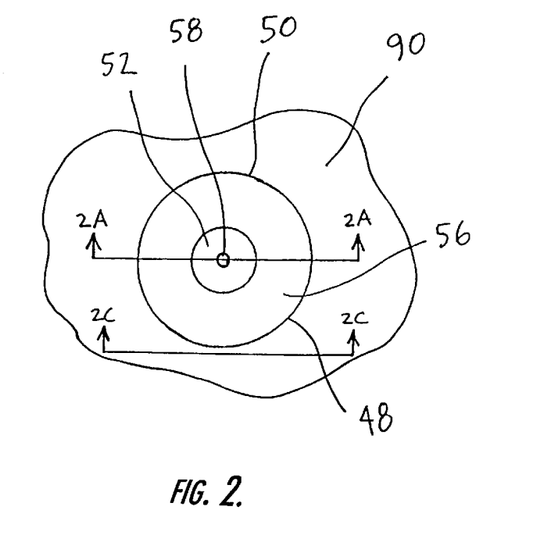
FIG. 2 is a plan view of an injector according to the present invention.
Figure 2A:
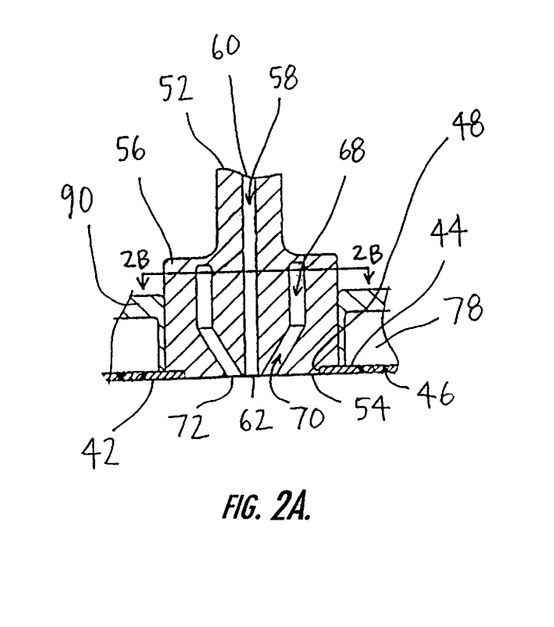
FIG. 2A is a cross section view of the injector of FIG. 2 as seen from line 2A—2A of FIG. 2.
Figure 2B:
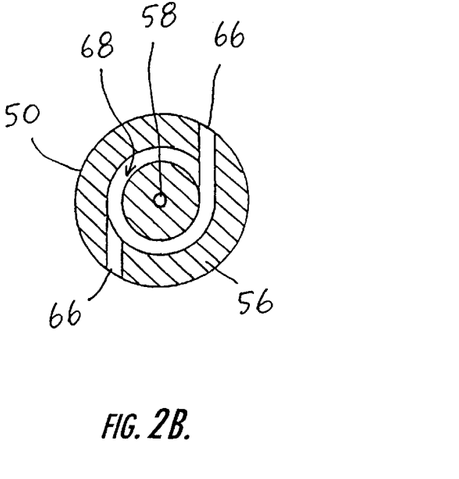
FIG. 2B is a cross section view of the injector of FIG. 2 as seen from line 2B—2B of FIG. 2A.
Figure 2C:
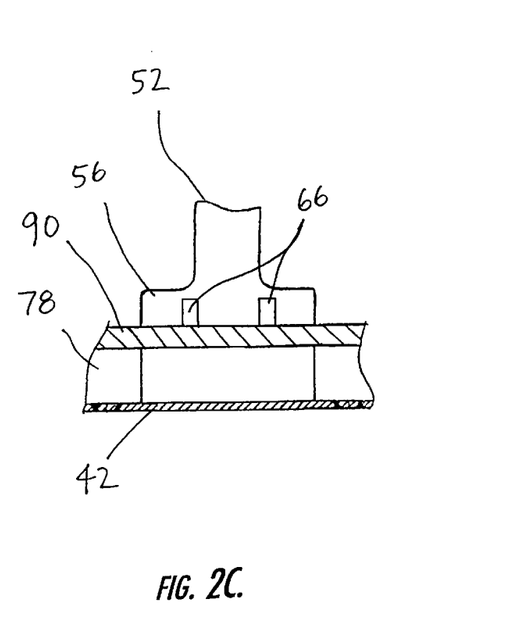
FIG. 2C is a cross section view of the injector of FIG. 2 as seen from line 2C—2C of FIG. 2.

An injector 50 according to one embodiment of the present invention is shown in FIGS. 2, 2A, 2B, and 2C. The injector 50 comprises an injector body 56 with an injector inlet side 52 and an injector outlet side 54. A fuel bore 58 extends from a fuel bore inlet 60 at the injector inlet side 52 to a fuel bore outlet 62 at the injector outlet side 54. The injector 50 also defines a swirler chamber 68 that comprises a cavity within the injector body 56. The swirler chamber 68 is fluidly connected to at least one swirler chamber inlet 66. Further, the swirler chamber 68 is fluidly connected to a swirler chamber outlet 72 via a converging channel 70. As shown in FIG. 2A, the converging channel 70 converges relative to the fuel bore 58 in a direction from the injector inlet side 52 toward the injector outlet side 54. Thus, fluid flowing from the swirler chamber 68 through the converging channel 70 impinges on a stream of fluid in the combustion chamber 30 flowing from the fuel bore 58. In one advantageous embodiment of the invention, the swirler chamber 68 and the converging channel 70 comprise a continuous slot that extends circumferentially around the fuel bore 58. Thus, fluid in the swirler chamber 68 and the converging channel 70 can flow circumferentially around the fuel bore 60. Preferably, oxygen and steam are supplied as a pre-mixed gas to the swirler chamber 68, for example, by mixing in the oxidizing fluid inlet 16, but the oxygen and steam can also be supplied separately to the swirler chamber 68 through separate swirler chamber inlets (not shown) and mixed in the swirler chamber 68 to form the oxidizing fluid. The oxygen may be pure oxygen or a gas that includes oxygen. Similarly, the steam supplied to the swirler chamber 68 can be pure steam or a mixture that includes steam. For example, the steam can be supplied in a recycle gas that is exhausted from the combustion device 10 or a turbine. As shown in FIGS. 2B and 2C, the swirler chamber inlets 66 extend in an radial direction out from the swirler chamber 68 to the outside of the injector body 56. Fluid flowing into the swirler chamber 68 through the swirler chamber inlets 66 flows in a direction perpendicular to a longitudinal axis of the injector 50. When the fluid enters the swirler chamber 68 it is directed in a swirling direction circumferentially around the fuel bore 58. Further, the rotational component of the velocity of the fluid due to the swirling in the swirler chamber 68 facilitates the mixing of the fluid from the swirler chamber 68 with the stream of fluid 30 flowing from the fuel bore 58 in the combustion chamber 30.

For illustrative purposes, a part of the primary faceplate 42 is also shown in FIG. 2A. The primary faceplate 42 has an inlet side 44 and an outlet side 46 and defines a plurality of injector receptacles 48, which are configured to receive the injectors 50. The injector 50 is positioned so that the injector outlet 54 faces the same direction as the faceplate outlet side 46. There is also shown part of a secondary faceplate 90 that is generally parallel to the primary faceplate 42 and faces the faceplate inlet side 44 of the primary faceplate 42. The two faceplates 42, 90 are positioned in a spaced arrangement to define at least one faceplate coolant chamber 78 therebetween. A coolant can be supplied to the faceplate coolant chamber 78 to control the temperature of the faceplates 42, 90 and, hence, the injectors 50. The coolant can also be injected from the faceplate coolant chamber 78 into the combustion chamber 30 through a plurality of faceplate coolant jets 80 that extend through the primary faceplate 42. In the embodiment shown in FIGS. 2, 2A, 2B, and 2C, which is especially suited for use with a combustion device 10 that comprises a gas generator, the faceplate coolant chamber 78 is configured to inject liquid water into the combustion chamber 30. Each of the faceplate coolant jets 80 comprises a standard triplet rocket engine injection element defining three separate passages arranged in a triplet formation. Other faceplate coolant jets 80 may also be used, for example, doublets or singlets. In an alternative embodiment, especially suited for use with a combustion device 10 that comprises a reheater, the faceplate coolant chamber 78 is configured to inject gaseous steam into the combustion chamber 30 as discussed further below.

Figure 3:
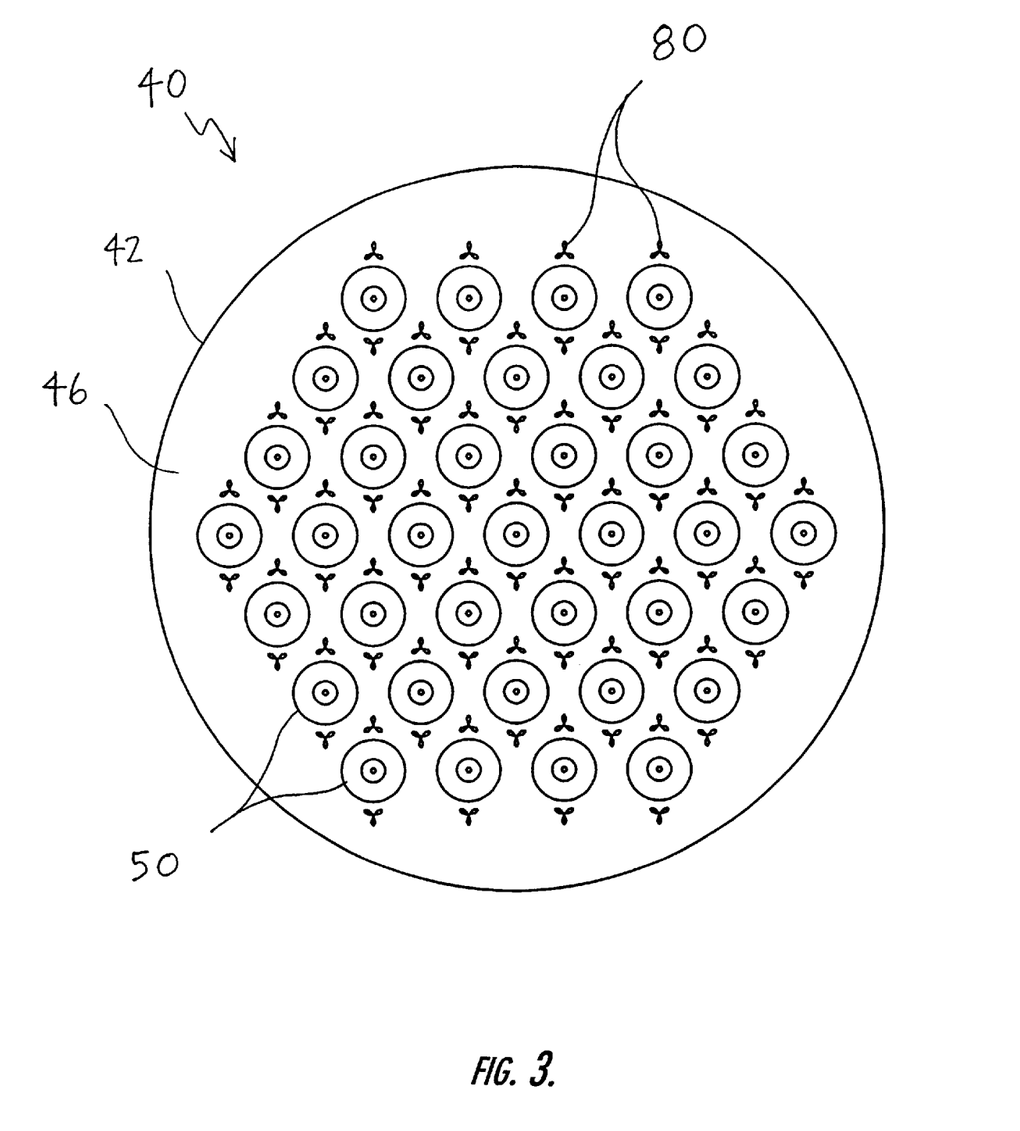
FIG. 3 is a plan view of an injection system compatible with the injector of FIG. 2.

Together, the injectors 50 and faceplates 42, 90 comprise an injection system 40. FIG. 3 illustrates the injection system 40 according to one embodiment of the present invention. The injectors 50 are arranged at consecutively spaced positions across the faceplate 42, and the faceplate coolant jets 80 are located among the injectors 50. In one advantageous embodiment of the invention, the fuel bore inlet 60 is fluidly connected to a source of carbonaceous fuel (not shown) and the swirler chamber inlet 66 is fluidly connected to a source of oxidizing fluid (not shown). The carbonaceous fuel can comprise, for example, methane, ethane, propane, or a mixture of hydrocarbons. The fuel can be derived from crude oil or a biomass fuel. Two advantageous carbonaceous fuels are methane and a synthesis gas, or syngas, which includes hydrogen and carbon monoxide. The oxidizing fluid preferably comprises oxygen and water. Unless expressly noted otherwise, the term "water" as used throughout this patent is meant to include water in any form, for example, liquid water or steam. The carbonaceous fuel and oxidizing fluid can be in a liquid, gaseous, or combined phase. In one advantageous embodiment of the invention, the carbonaceous fuel and the oxidizing fluid are supplied in gaseous form and substantially free of nitrogen and sulfur. In the context of this patent, the phrase "substantially free of nitrogen and sulfur" indicates a combined content of less than 0.1 percent nitrogen and sulfur by weight and preferably less than 0.01 percent. Oxygen can be separated from atmospheric air according to methods known in the art and may include trace gases, such as argon.

Figure 4:
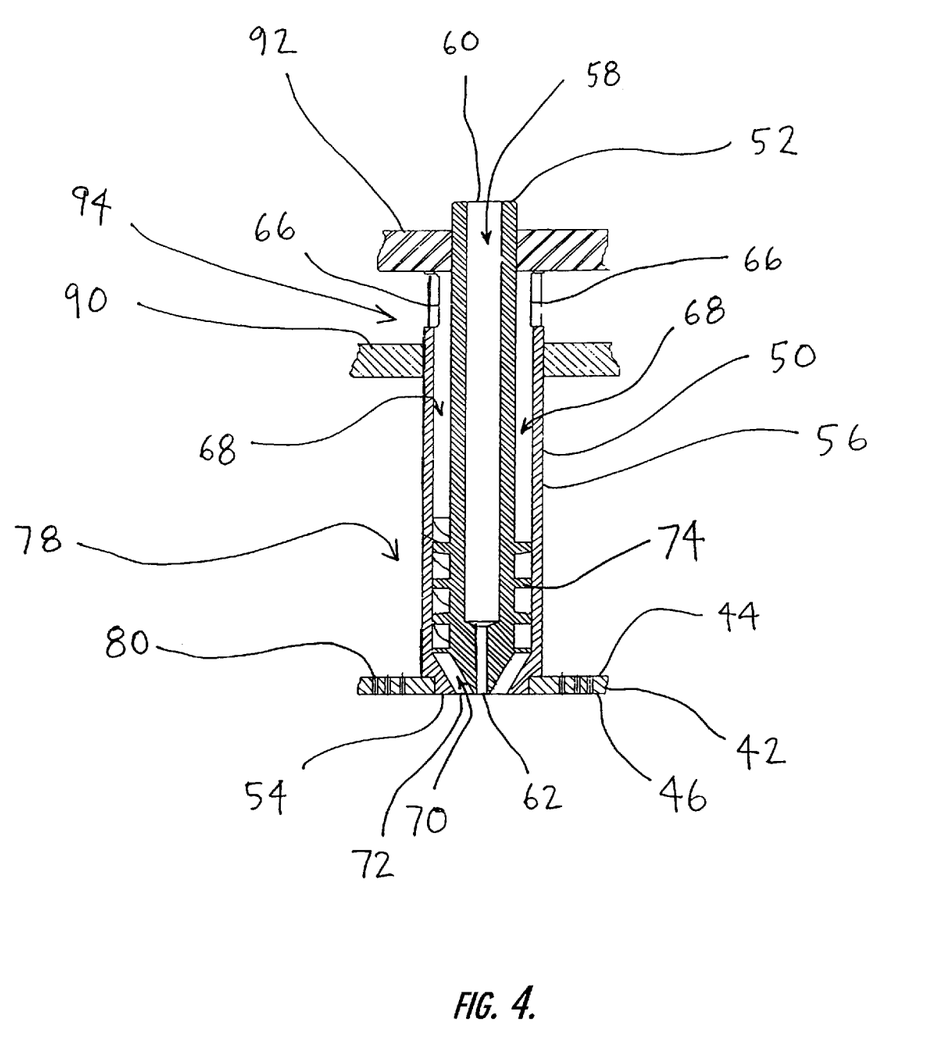
FIG. 4 is a cross section view of another injector according to the present invention.
Figure 5:
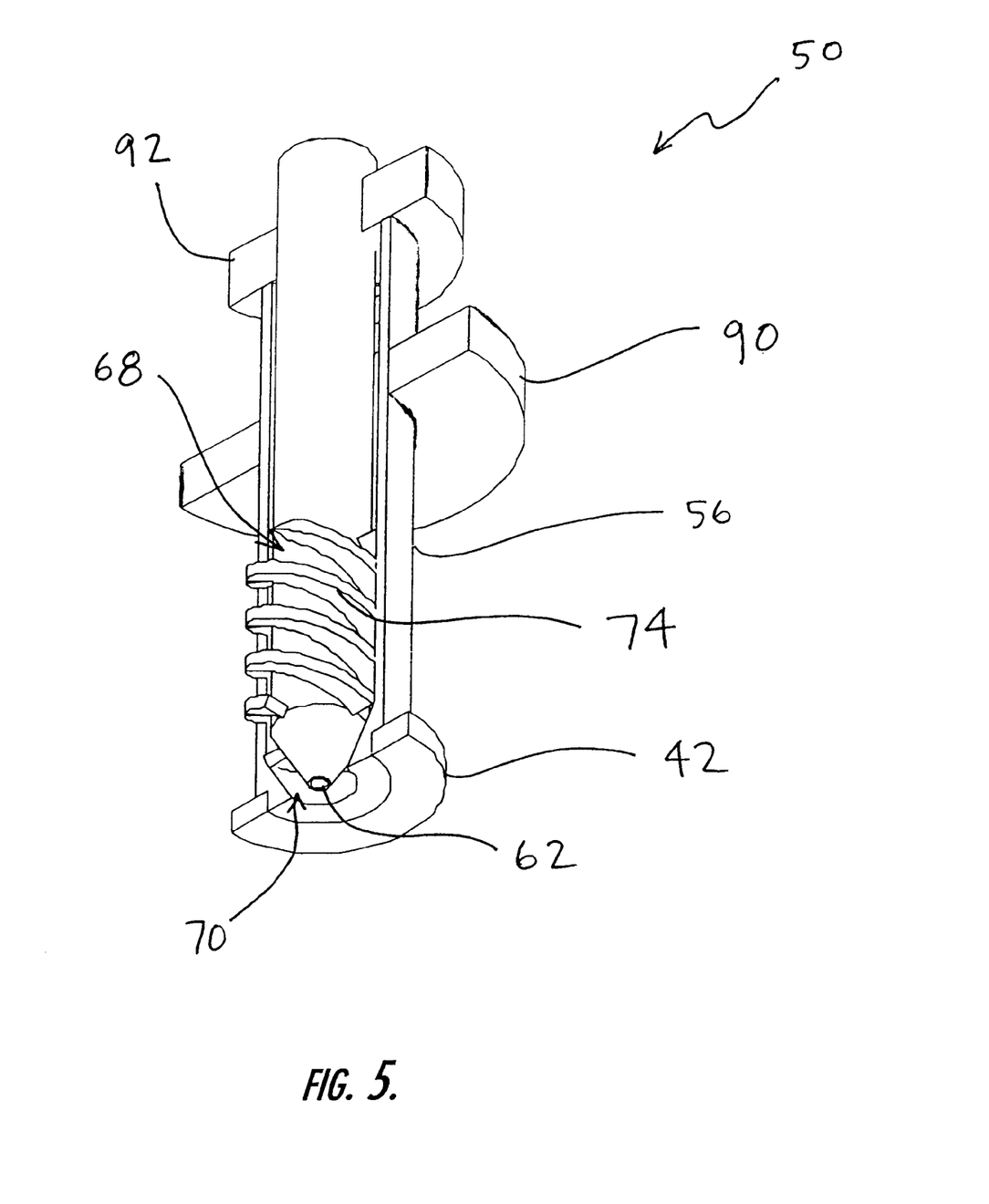
FIG. 5 is an isometric cut-away view of the injector of FIG. 4.

There is shown in FIG. 4 another advantageous embodiment of the injector 50, which may be used in various combustion devices, and is preferably used in an injection system for a reheater. As previously discussed in connection with FIGS. 2, 2A, 2B, and 2C, the injector 50 includes the injector body 56, the fuel bore 58, and the swirler chamber 68. The fuel bore 58 of this embodiment converges so that the diameter of the fuel bore 58 is larger at the fuel bore inlet 60 than at the fuel bore outlet 62. Additionally, the swirler chamber 68 includes a thread-shaped vane 74 that induces a swirling motion to fluid that progresses through the swirler chamber 68. The vane 74, which is shown more clearly in FIG. 5, is a single vane, but in other embodiments, the vane 74 may comprise a number of vanes for swirling the oxidizing fluid. The swirling imparts a rotational component to the velocity of the oxidizing fluid that facilitates the mixing of the oxidizing fluid with the stream of fuel on which the oxidizing fluid impinges in the combustion chamber 30.

The swirler chamber inlet 66 is located between the secondary faceplate 90 and the interpropellant plate 92. When the injector 50 is positioned in the injection system 40 of the combustion device 10 as shown in FIG. 1, oxidizing fluid enters the oxidizing fluid inlet 16 and flows into an oxidizing fluid chamber 94 defined by the interpropellant plate 92 and the secondary faceplate 90. The oxidizing fluid flows from the oxidizing fluid chamber 94, though the swirler chamber inlets 66, and into the swirler chamber 68. The oxidizing fluid is then swirled by the vane 74 and progresses through the converging channel 70 which directs the oxidizing fluid through the swirler chamber outlet 72 and in a converging direction toward a stream of fluid discharged from the fuel bore outlet 62.

Figure 6:
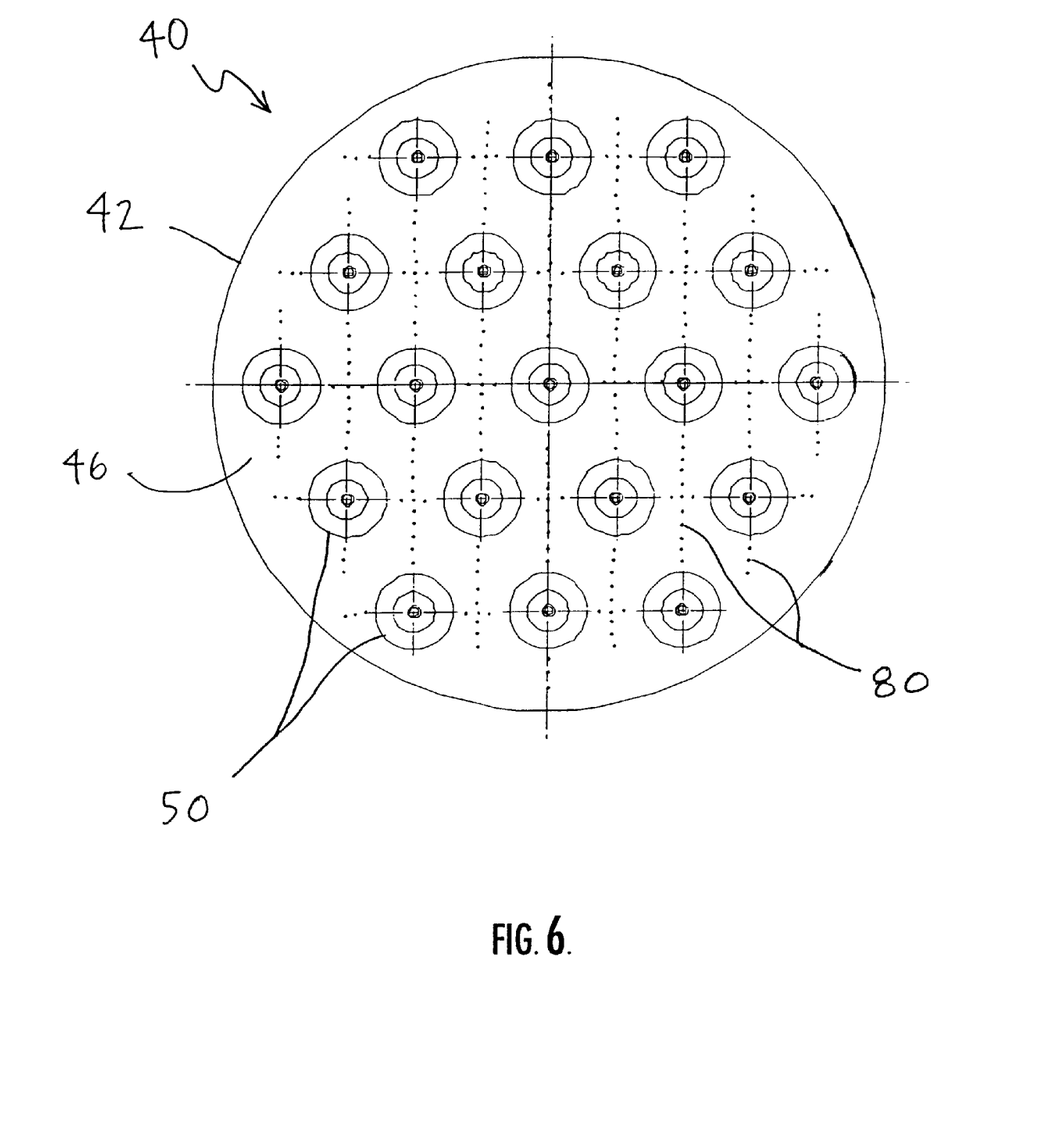
FIG. 6 is a plan view of an injection system compatible with the injector of FIG. 4.

Together, the injectors 50, faceplates 42, 90, and interpropellant plate 92 form the injection system 40 shown in FIG. 6. As discussed in connection with FIG. 3, the injectors 50 are arranged at consecutively spaced positions across the faceplate 42, and the faceplate coolant jets 80 are located between the injectors 50. The inlets 60, 66 can be fluidly connected to sources of carbonaceous fuel and oxidizing fluid. Preferably, the faceplate coolant chamber 78 of the embodiment of FIG. 4 is fluidly connected to a source of gaseous coolant, for example, steam, which is injected into the combustion chamber 30 through the faceplate coolant jets 80. Alternatively, the faceplate coolant chamber 78 can be supplied with a liquid coolant, such as liquid water, as described in connection with FIGS. 2, 2A, 2B, and 2C.

Thirty-seven injectors 50 and nineteen injectors 50 are shown in the injection systems 40 illustrated in FIGS. 3 and 6 respectively, but any number of injectors 50 may be provided. The size of the fuel bore 58, swirler chamber 68, and converging channel 70 of each injector 50 is chosen so that predetermined flow rates of the carbonaceous fuel and oxidizing fluid through the injectors 50 can be achieved. For example, predetermined flow rates can be achieved by supplying the carbonaceous fuel and oxidizing fluid to the fuel inlet 14 and the oxidizing fluid inlet 16, respectively, at predetermined pressures higher than the pressure in the combustion chamber 30. In one advantageous embodiment, especially suited for use in a gas generator, each of the fuel bores 58 has a diameter at the primary faceplate 42 of at least about 0.2 inches, and a center of each of the injectors 50 is at least about 1 inch from the centers of the other injectors 50. The faceplate coolant jets 80 are positioned between the injectors 50 and configured to discharge liquid water into the combustion chamber 30 of the gas generator. In another advantageous embodiment, especially suited for use in a reheater, each of the fuel bores 58 has a diameter at the primary faceplate 42 of at least about 2 inches, and a center of each of the injectors 50 is at least about 4 inches from the centers of the other injectors 50. The faceplate coolant jets 80 are positioned between the injectors 50 and configured to discharge gaseous steam into the combustion chamber 30 of the reheater.

The converging angle of the converging channel 70 relative to the fuel bore 58 and the diameter of the swirler chamber outlet 72 affect the extent to which the oxidizing fluid mixes with the fuel as well as the location in the combustion chamber 30 at which the oxidizing fluid and fuel become sufficiently mixed for combustion. If the mixing and the combustion of the fuel and oxidizing fluid occur close to the primary faceplate 42, the primary faceplate 42 and the injector 50 may be more subject to the heat generated by the combustion and require additional cooling. In one advantageous embodiment of the present invention, the converging channel 70 converges toward the fuel bore 58 at an angle of between about 10° and 45°, as measured between the converging channel 70 and the fuel bore 58. In another embodiment, the converging channel 70 is configured such that oxidizing fluid flowing from the converging channel 70 impinges on the stream of fuel flowing from the fuel bore 58 in a region located within about 2 inches of the primary faceplate 42. Further, the faceplate coolant jets 80 can be configured such that coolant discharged from the faceplate coolant jets 80 does not mix with the fuel or oxidizing fluid within a region extending about 10 inches from the primary faceplate 42. Thus, the oxidizing fluid mixes with the fuel and facilitates a uniform combustion of the fuel. However, the fuel is not mixed and combusted so close to the injectors 50 that the combustion occurs in the injectors 50 or overheats the injectors 50. Further, the coolant injected through the faceplate coolant jets 80 does not mix with the oxidizing fluid or fuel until after the oxidizing fluid and fuel have begun to combust, so that the fuel begins to combust before being cooled and diluted by the coolant.

The sizes of the fuel bore 58, the fuel bore inlet 60, the fuel bore outlet 62, the swirler chamber 68, the converging channel 70, and the swirler chamber outlet 72 are preferably chosen in consideration of the heating value of the fuel and the operating pressure of the combustion chamber 30. For example, the appropriate size of the fuel bore 58, the fuel bore inlet 60, and the fuel bore outlet 62 can be determined according to the heating value of the fuel and the desired heat generation for the combustion device 10. Appropriate sizes of the swirler chamber 68, the converging channel 70, and the swirler chamber outlet 72 can be determined according to the required mass flow rate of oxidizing fluid for the desired combustion and the necessary momentum of the oxidizing fluid into the combustion chamber 30 for proper mixing with the fuel.

According to one advantageous embodiment of the present invention, a carbonaceous gas is supplied to the fuel bores 58 of the injectors 50 of the injection system 40 of the combustion device 10, for example by fluidly connecting the fuel inlet 14 of the combustion device 10 to the source of carbonaceous gas. Oxygen gas and steam are supplied to the swirler chambers 68 of the injectors 50 of the injection system 40 of the combustion device 10, for example, by fluidly connecting a source of oxygen gas and steam to the oxidizing fluid inlet 16. The carbonaceous gas is injected into the combustion chamber 30 through the fuel bores 58, and the oxygen gas and steam are injected into the combustion chamber 30 through the swirler chambers 68. The carbonaceous gas enters the combustion chamber 30 as a stream injected from the fuel bore outlets 62. The oxygen gas and steam mix together in the oxidizing fluid inlet 16, and the oxidizing fluid chamber(s) 94 to form the oxidizing fluid. The oxidizing fluid progresses through the converging channels 70 and converges toward the fuel bores 58 of the respective injectors 50. After entering the combustion chamber 30, the oxidizing fluid from each converging channel 70 impinges upon the stream of carbonaceous gas injected from the respective fuel bore outlet 62. The impingement of the oxidizing fluid on the carbonaceous gas mixes the oxidizing fluid with the carbonaceous gas, and facilitates the efficient combustion of the fluids in the combustion chamber 30. Liquid water is supplied as the coolant to the faceplate coolant chamber 78 and discharged to the combustion chamber 30 through the faceplate coolant jets 80. Preferably, the liquid water impinges on, and mixes with, the carbonaceous gas and oxidizing fluid after the carbonaceous gas and the oxidizing fluid have begun to combust.

The combustion of the carbonaceous fuel and oxidizing fluid in the combustion chamber 30 generates a combusted gas and causes an increase in temperature and gas volume and a corresponding increase in pressure. The combustion chamber 30 can comprise a channel or passage extending from the primary faceplate 42 to a power take-off device such as a turbine. Preferably, the combustion chamber 30 is uninterrupted by splash plates so that the combusted gas can be efficiently discharged to a turbine. Steam or water can be injected through the forward chamber coolant injector 32 or the aft chamber coolant injector 34, but preferably the combusted gas is sufficiently cooled by steam and/or water injected through the primary faceplate 42 so that the chamber coolant injectors 32, 34 are not required, thus reducing the likelihood of water droplets reaching the turbine and damaging blades of the turbine. The turbine expands the combusted gas and generates useful energy for use or storage, for example, by rotating an electric generator (not shown) that is coupled to the blades of the turbine. The electric generator generates electricity that is used or stored. After passing through the turbine, the injectors 50 of another injection system 40 inject the combusted gas into a reheater (not shown) where the combusted gas is recombusted with additional oxygen. Steam is also injected into the combustion chamber of the reheater through faceplate coolant jets 80 to control the combustion temperature. The reheater increases the temperature and/or pressure of the combusted gas to form a reheated gas. Energy is extracted from the reheated gas by discharging the reheated gas to a turbine.

Alternatively, the injectors 50 can be used to inject a carbonaceous gas, oxidizing fluid, and coolant into a reheater that acts as the initial combustion device of power generation cycle, such as the one described in U.S. patent application Ser. No. [. . .], titled "LOW-EMISSION, STAGED-COMBUSTION POWER GENERATION," filed concurrently herewith and the entirety of which is incorporated herein by reference. The injectors 50 may also be used for injecting combustion fluids as described in connection with the other systems and methods of the referenced patent application. In any case, by adding steam and/or liquid water to the combustion chamber 30, the temperature of the combustion chamber 30, and hence the injectors 50, can be controlled. In one advantageous embodiment, the temperature of the flame of the combustion in the combustion chamber 30 is limited to below about 4000° F.

Many modifications and other embodiments of the invention will come to mind to one skilled in the art to which this invention pertains having the benefit of the teachings presented in the foregoing descriptions and the associated drawings. For example, while the primary faceplate 42 is described as a separate component that defines injector receptacles 48 for receiving the injectors 50, it is understood that the faceplates 42, 90, the interpropellant plate 92, and the injectors 50 can be formed as integral parts.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An injection system for injecting combustion fluids into a combustion chamber, comprising:

a first faceplate having an inlet side and an outlet side, the outlet side facing the combustion chamber; and a plurality of injectors extending through the first faceplate, each of the injectors having an injector body defining an injector outlet side, a fuel bore extending from a fuel bore inlet to a fuel bore outlet located at the injector outlet side, a swirler chamber having at least one inlet for receiving steam and oxygen, an oxidizing fluid outlet located on the injector outlet side, and a converging channel extending from the oxidizing fluid outlet to the swirler chamber;

wherein the converging channel of each injector is configured relative to the fuel bore of the respective injector such tat an oxidizing fluid exiting the injectors through the oxidizing fluid outlets impinges on a stream of fuel in the combustion chamber following exit of the stream of fuel from the fuel bore of the respective injector.

2. An injection system according to claim 1 further comprising a source of carbonaceous fuel fluidly connected to each of the fuel bore inlets of the injectors.

3. An injection system according to claim 1 wherein a center of each of the injectors is located at least 1 inch from the centers of the other injectors.

4. An injection system according to claim 1 wherein each inlet of the swirler chambers of the injectors is fluidly connected to a source of the oxidizing fluid comprising steam and oxygen substantially free of nitrogen and sulfur.

5. An injection system according to claim 4 wherein the oxidizing fluid comprises at least 50% steam as measured on a weight basis.

6. An injection system according to claim 1 wherein each of the swirler chambers defines a slot that extends circumferentially around the fuel bore of the respective injector.

7. An injection system according to claim 1 wherein the converging channel of the injector converges at an angle of between about 10° and 45° relative to the fuel bore of the respective injector such that the oxidizing fluid exiting each injector impinges on the stream of fuel in the combustion chamber.

8. An injection system according to claim 1 wherein the converging channel of each injector converges toward the respective fuel bore such that the oxidizing fluid exiting the injector impinges on the stream of fuel in the combustion chamber in a region located within about 2 inches of the first faceplate.

9. An injection system according to claim 1 further comprising a plurality of water injectors configured to inject water into the combustion chamber from the first faceplate.

10. An injection system according to claim 9 wherein the water injectors are configured such that the combustion fuel travels a distance of at least about 10 inches from the first faceplate before mixing with the water.

11. An injection system according to claim 9 wherein the water injectors are fluidly connected to at least one coolant chamber defined by the first faceplate.

12. An injection system according to claim 1 further comprising a second faceplate facing the inlet side of the first faceplate, wherein at least one coolant chamber is defined between the first faceplate and the second faceplate, the coolant chamber being configured to receive and circulate a coolant fluid for cooling the faceplate.

13. An injection system according to claim 12 further comprising an interpropellant plate facing the second faceplate, wherein the interpropellant plate and the second faceplate define at least one oxidizing fluid chamber fluidly connected to the at least one inlet of the swirler chambers of the injectors.

14. An injection system according to claim 1 further comprising at least one water injector configured to inject water into the combustion chamber at a location downstream of the faceplate.

15. An injection system according to claim 1 wherein the combustion chamber defines a passage from the outlet side of the first faceplate to a turbine, the passage being uninterrupted by splash plates.

16. An injection system according to claim 1 wherein each of the at least one inlets of the swirler chambers extends in a radial direction from the swirler chambers to the outside of the respective injector body such that fluid flowing into each of the swirler chambers through the swirler chamber inlets swirls in a circumferential direction around the respective fuel bore.

17. An injection system according to claim 1 further comprising at least one vane disposed in each of the swirler chambers of the injectors, each vane configured to induce a swirling motion to fluid flowing through the respective swirler chamber.

18. An injection system according to claim 1 wherein the diameter of each of the fuel bores converges in a direction from the respective fuel bore inlet to the respective fuel bore outlet.

19. An injector for injecting fluids into a combustion chamber, comprising:

an injector body having an inlet side and outlet side;

a fuel bore defined by the injector body and extending from a fuel bore inlet to a fuel bore outlet located on the outlet side of the injector body.

a swirler chamber defined by the injector body, the swirler chamber having at least one inlet for receiving steam and oxygen; and a converging channel extending from an oxidizing fluid outlet located at the outlet side of the injector body to the swirler chamber, wherein the converging channel is configured relative to the fuel bore such that an oxidizing fluid exiting the injector through the oxidizing fluid outlet impinges on a stream of fuel in the combustion chamber following exit of the stream of fuel from the fuel bore through the fuel outlet.

20. An injector according to claim 19 wherein the swirler chamber extends circumferentially about the fuel bore such that the steam and oxygen can flow circumferentially in the swirler chamber.

21. An injector according to claim 19 wherein the converging channel converges at an angle of between about 10° and 45° relative to the fuel bore such that the oxidizing fluid exiting the injector impinges on the stream of fuel in the combustion chamber.

22. An injector according to claim 19 wherein the converging channel of the injector is configured at a converging angle relative to the fuel bore such that the oxidizing fluid impinges on the stream of fuel in the combustion chamber in a region located within about 2 inches of the fuel bore outlet.

23. An injector according to claim 19 wherein each of the at least one inlets of the swirler chamber extends in a radial direction from the swirler chamber to the outside of the injector body such that fluid flowing into the swirler chamber through the swirler chamber inlets swirls in a circumferential direction around the fuel bore.

24. An injector according to claim 19 further comprising at least one vane disposed in the swirler chamber, each vane extending in a circumferential direction around the fuel bore and configured to induce a swirling motion to fluid flowing through the swirler chamber.

25. An injector according to claim 19 wherein the fuel bore converges in a direction from the fuel bore inlet to the fuel bore outlet.

26. An injector for injecting fluids into a combustion chamber, comprising:
   an injector body having an inlet side and outlet side;
   a fuel bore defined by the injector body and extending from a fuel bore inlet to a fuel bore outlet located on the outlet side of the injector body and directed toward the combustion chamber;
   a swirler chamber defined by the injector body, the swirler chamber having at least one inlet for receiving steam and oxygen, the swirler chamber extending to an oxidizing fluid outlet located at the outlet side of the injector body, and the swirler chamber extending circumferentially about the fuel bore such that the steam and oxygen can flow circumferentially in the swirler chamber; and
   at least one vane disposed in the swirler chamber, each vane extending in a circumferential direction around the fuel bore and configured to induce a swirling motion to fluid flowing through the swirler chamber;
   wherein the oxidizing fluid outlet is configured relative to the fuel bore outlet such that the steam and oxygen exiting the oxidizing fluid outlet impinges on a stream of fuel in the combustion chamber following exit of the stream of fuel from the fuel bore outlet.

27. An injector according to claim 26 wherein each of the at least one inlet of the swirler chamber extends in a radial direction from the swirler chamber to the outside of the injector body such that fluid flowing into the swirler chamber through the swirler chamber inlets swirls in a circumferential direction around the fuel bore.

28. An injector according to claim 26 wherein the fuel bore converges in a direction from the fuel bore inlet to the fuel bore outlet.

29. A method of injecting and combusting combustion fluids in a combustion chamber, comprising:
   injecting a combustion fuel into the combustion chamber;
   mixing steam with oxygen substantially free of nitrogen and sulfur to form an oxidizing fluid;
   injecting the oxidizing fluid into the combustion chamber, such that the oxidizing fluid impinges on the combustion fuel in the combustion chamber; and
   combusting the combustion fuel with the oxidizing fluid.

30. A method according to claim 29 wherein injecting a combustion fuel comprises injecting a carbonaceous gas.

31. A method according to claim 29 wherein injecting a combustion fuel comprises injecting the combustion fuel through a plurality of injectors, injecting an oxidizing fluid comprises injecting the oxidizing fluid through the plurality of injectors, and a center of each of the injectors is located at least 1 inch from the centers of the other injectors.

32. A method according to claim 29 further comprising mixing the steam and oxygen by swirling the steam and oxygen in a circumferential direction within an injector.

33. A method according to claim 29 wherein injecting an oxidizing fluid comprises injecting an oxidizing fluid comprising at least 50% steam as measured on a weight basis.

34. A method according to claim 29 wherein injecting the combustion fuel comprises injecting the combustion fuel through a fuel bore outlet and wherein injecting the oxidizing fluid comprises injecting the oxidizing fluid at an angle of between about 10° and 45° relative to the fuel bore such that the oxidizing fluid impinges on the combustion fuel in the combustion chamber.

35. A method according to claim 29 wherein injecting the combustion fuel comprises injecting the combustion fuel through a fuel bore outlet and wherein injecting the oxidizing fluid comprises injecting the oxidizing fluid such that the oxidizing fluid impinges on the combustion fuel in the combustion chamber in a region located within about 2 inches of the fuel bore outlet.

36. A method according to claim 29 wherein injecting a combustion fuel comprises injecting the combustion fuel through a faceplate and further comprising injecting a coolant into the combustion chamber through the faceplate.

37. A method according to claim 36 wherein injecting coolant comprises injecting the coolant in a direction such that the combustion fuel travels a distance of at least about 10 inches into the combustion chamber before mixing with the coolant.

38. A method according to claim 29 further comprising circulating a coolant through a faceplate cooling chamber defined by the faceplate.

39. A method according to claim 29 wherein injecting an oxidizing fluid comprises injecting steam into the combustion chamber to limit the flame temperature to below about 4000° F.

* * * * *